Patented Nov. 6, 1934

1,979,327

UNITED STATES PATENT OFFICE 1,979,327

WATER-SOLUBLE AZO DYE INTERMEDIATE

Fletcher Beach Holmes and Miles Augustinus Dahlen, Wilmington, Del., assignors to E. I. du Pont de Nemours & Company, Wilmington, Del., a corporation of Delaware No Drawing. Application April 14, 1933, Serial No. 666,174

18 Claims. (Cl. 260—69)

This invention relates to the manufacture of new water-soluble compounds suitable for use in one-bath dyeing processes, and more particularly refers to diazoimino compounds having the following general formula:

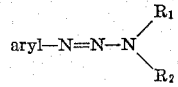

in which aryl represents an aryl nucleus preferably of the benzene, naphthalene, diphenyl, diphenyl-ether, azobenzene, diphenylamine, anthraquinone, or carbazole series, which may be further substituted, but should be free from groups such as sulfonic acid or carboxylic acid which render the dyes prepared therefrom water-soluble; and $R_1$ and $R_2$ represent aliphatic or hydroaromatic residues one or both of which is further substituted by one or more hydroxyl groups, and in addition one or both of which is further substituted by one or more sulfonic acid and/or carboxylic acid groups.

It is an object of the present invention to prepare readily soluble dye intermediates which thoroughly impregnate the fiber, and which may be readily converted upon suitable treatment to a diazo salt and a secondary amine. A further object is to produce compounds which are well adapted for use in one-bath dyeing processes. Additional objects will become apparent from a consideration of the following description.

These objects are attained according to the herein described invention wherein an aromatic amine having the following general formula:

is diazotized and coupled with a secondary amine having the following general formula:

In the above formulas aryl, $R_1$ and $R_2$ have the same definitions as previously given, supra. This reaction may be conveniently carried out in water solution in the presence of suitable acid-binding agents such as sodium carbonate, sodium bicarbonate or sodium acetate.

The invention may be more fully understood by a consideration of the following illustrative examples, in which the quantities are given in parts by weight:

Example 1

14.2 parts of para-chloro-ortho-toluidine were stirred with 25 parts of hydrochloric acid of 30% strength, ice added to adjust the temperature to 5° C., and the amine diazotized by the addition of 7 parts of sodium nitrite dissolved in 20 parts of water. When diazotization was complete, the solution was filtered to remove any insoluble matter.

To the filtered diazo solution was added 18 parts of ethanol-taurine, followed by sufficient sodium carbonate solution to render the mass strongly alkaline. When interaction of the diazo salt and secondary amine was complete, as shown by a negative test for diazo salt when the solution was spotted with alkaline H-acid, sodium chloride was added to saturate the solution. The new diazoimino compound, which precipitated as a light colored solid, was separated by filtration, washed with a little ice-cold water, and then dried at about 50° C. It was readily soluble in water, stable in alkaline solution, but was rapidly hydrolyzed to the diazo salt and ethanol-taurine by the action of hot dilute acids. It has the probable formula:

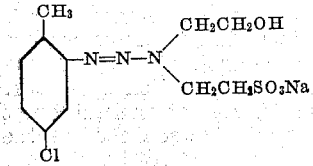

It may be used in the printing of textile fibers with ice colors, as typified by the following example:

5 parts of the dry diazoimino compound were ground with 4 parts of the ortho-toluidide of 2-3-hydroxy-naphthoic acid, to give a dry printing powder. A printing paste was then made up from this powder, caustic soda, the usual thickeners and assistants. Cotton piece goods were printed with this paste from an engraved roll. The printed material was then immersed in a solution of 5% Glauber's salt, 5% acetic acid and 2.5% of formic acid, previously heated to 210° F.

The pattern was developed as a bright red dyeing, due to the formation on the fiber of the dyestuff of the probable formula:

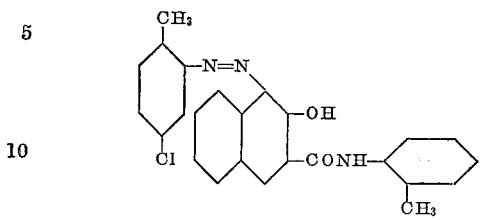

The fabric was rinsed, soaped, again rinsed, then dried.

Following is another similar printing process:

10 parts of the diazoimino compound were mixed with 7 parts of the diacetoacetyl derivative of tolidine. This powder was made up to a printing paste in the usual manner, and piece goods printed from an engraved roll. The printed fiber was then subjected to the action of live steam containing the vapors of acetic acid, resulting in the development of the pattern as a bright yellow dyeing, due to the formation on the fiber of the dyestuff of the probable formula:

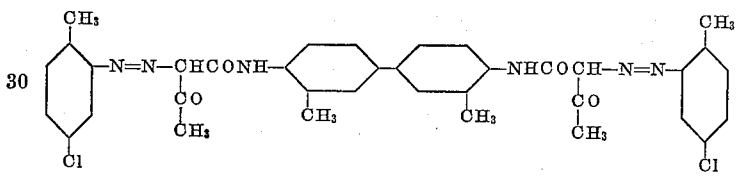

The fabric was rinsed, soaped, rinsed and dried, as usual.

*Example 2*

16.7 parts of 2, 5-dichloro-aniline were stirred with 50 parts of hydrochloric acid of 20% strength until the base was converted to the hydrochloride.

Ice was then added to adjust the temperature to 10° C., followed by a solution of 7.0 parts of sodium nitrite in 20 parts of water. When diazotization was complete, the solution was filtered to remove small quantities of insoluble matter.

To the filtrate was added 13 parts of ethanol-glycine, followed by sufficient sodium carbonate solution to render the solution alkaline. When formation of the diazoimino compound was complete, as shown by the disappearance of a test for diazo salt, the solution was saturated with sodium chloride. The diazoimino compound separated as a light colored solid, of the probable formula:

The product was filtered and dried. It was readily soluble in water, and was converted to the parent diazo salt and ethanol-glycine by the action of hot dilute acids.

In the production of ice colors, the product may be used for example as follows:

Equal quantities of the dry diazoimino compound and the ortho-phenetidide of 2-3-hydroxy-naphthoic acid were ground to a fine powder. A printing paste was then made up from this powder, caustic soda, neutral gum, and the usual thickeners; and cotton piece goods were printed from an engraved roll with this paste. The print was then subjected to the action of live steam containing the vapors of acetic acid, resulting in hydrolysis of the diazoimino compound and immediate coupling of the diazo salt thus formed with the coupling component. The printed fabric was rinsed, soaped, again rinsed, and dried. The pattern was developed as a bright fast orange dyeing, due to the production on the fiber of the dyestuff of the probable formula:

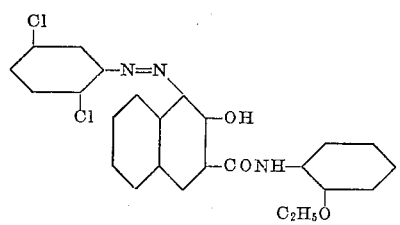

The diazoimino compound may also be mixed with two-thirds of its weight of the diacetoacetyl derivative of tolidine. This powder was also made up into an alkaline paste, cotton goods printed as above, and then developed in a similar fashion. In this case, the pattern was developed as a bright yellow dyeing, due to the formation of the dyestuff of the probable formula:

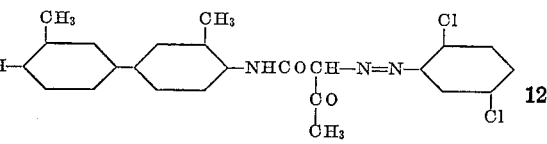

*Example 3*

12.8 parts of meta-chloro-aniline were stirred with 25 parts of hydrochloric acid of 30% strength. The mass was cooled to 5° C. and diazotized by the addition of 7.0 parts of sodium nitrite as a solution of 25% strength. When diazotization was complete, about 32 parts of glucyl-taurine of the probable formula:

$CH_2OH(CHOH)_4CH_2NHCH_2CH_2SO_3H$ (obtained, for example, by the action of β-bromo-ethyl-sulfonic acid on glucamine) were added, followed by sufficient sodium carbonate solution to render the mass alkaline to phenolphthalein papers. Rapid interaction between the diazo salt and the secondary amine takes place, the completion of which was indicated by a negative test for diazo salt when the mass was "spotted" with alkaline H-acid. When the formation of the diazoimino compound was complete, the solution was saturated with sodium chloride, resulting in the precipitation of the product. It was removed by filtration, washed with cold brine, and dried. It was a light colored solid, readily soluble in water, stable toward alkalies, but hydrolyzed to diazo-meta-chlor-aniline by the action of hot dilute acids. It has the probable formula:

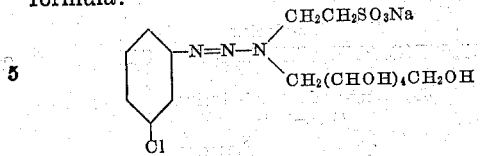

It may be used in printing compositions similar to those described in Example 1. It may also be used in dyeing processes, such as the following:

Well boiled cotton skeins were impregnated in the usual manner with the anilide of 2-3-hydroxy-naphthoic acid. They were then immersed in a 5% solution of the above diazoimino compound in cold (20° C.) water. The solution was made strongly acid to litmus papers (but not to Congo red papers) by the addition of acetic acid. The mass was then heated to boiling over a period of 10 minutes, and held at that point for 5 minutes. The skeins were then removed, rinsed, soaped at the boil, again rinsed and dried. The cotton was dyed a bright orange of good fastness properties, due to the formation of the dyestuff of the probable formula:

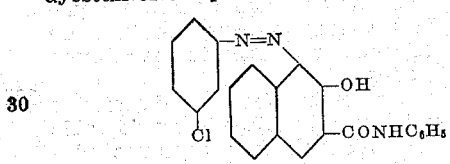

Example 4

15.8 parts of 4-chloro-2-amino-anisole were stirred with 40 parts of hydrochloric acid of 20% strength. Ice was added to adjust the temperature to 5° C., and the base was diazotized by the addition of a solution of 7 parts of sodium nitrite in the minimum quantity of water. The diazo solution thus obtained was filtered to remove any insoluble matter.

To the clarified diazo solution was then added about 25 parts of the amino acid of the probable structure:

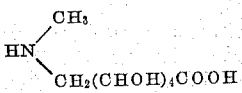

obtained, for example, by the oxidation of the terminal alcoholic group of methyl-glucamine. Enough sodium carbonate was then added to render the solution distinctly alkaline. When interaction to form the diazoimino compound was complete, as shown by the absence of diazo salt when the solution was tested with alkaline H-acid enough sodium chloride was added to precipitate the diazoimino compound. The solid was filtered off and washed with a very small quantity of ice water, to remove adhering mother liquor. It was then dried at moderate temperatures. The new diazoimino compound, which was a light colored solid readily soluble in water or alkalies, has the probable structure:

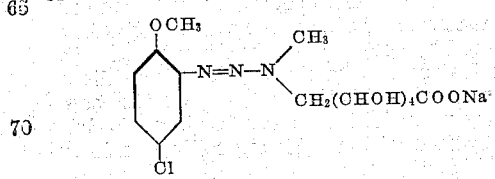

When 10 parts of the above diazoimino compound was mixed with about 8 parts of the ortho-anisidide of 2-3-hydroxy-naphthoic acid, and this powder used in printing processes similar to those described in the preceding examples, beautiful red prints of excellent fastness properties were obtained on cotton piece goods. The dyeings were due to formation on the fiber of the dyestuff of the probable formula:

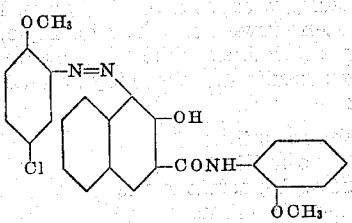

Example 5

31 parts of 4-benzoylamino-2,5-diethoxy-aniline were stirred with about 30 parts of hydrochloric acid of 25% strength, the solution cooled with ice to 0° C., and the amine-hydrochloride diazotized by the addition of 7.0 parts of sodium nitrite dissolved in 20 parts of water. To the diazo solution thus prepared was added about 22 parts of the secondary amine of the structure:

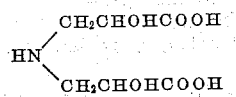

(obtained, for example, by the action of ammonia on β-bromo-lactic-acid), followed by sufficient sodium carbonate to render the solution alkaline to phenolphthalein papers. Reaction of the diazo salt with the amine was complete when the mass failed to give a positive test for diazo when tested with alkaline H-acid. The product was isolated by evaporating the solution to dryness under reduced pressure. The new diazoimino compound of the probable structure:

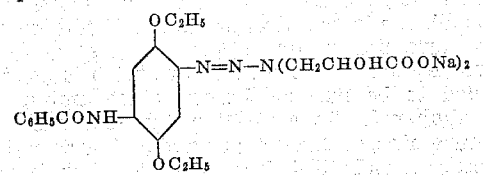

may be purified, if desirable, by extraction with alcohol (in which the by-product inorganic salts are practically insoluble), followed by evaporation of the alcoholic extract at low temperatures.

The new product may be used in printing processes similar to those described in the preceding examples. It may be also used in dyeing procedures, such as the following:

Bleached cotton skeins were "padded" in the usual manner with the anilide of 2-3-hydroxy-naphthoic acid. They were then immersed in a cold 5% solution of the new diazoimino compound, to which had been added enough acetic acid to render the solution strongly acid to litmus papers (but alkaline to Congo red papers). The solution was then heated during about 10 minutes, finally to 100° C. The skeins were then removed, rinsed, soaped, again rinsed, and dried. The fiber was dyed a bright fast blue, due to the formation of the dyestuff of the probable formula:

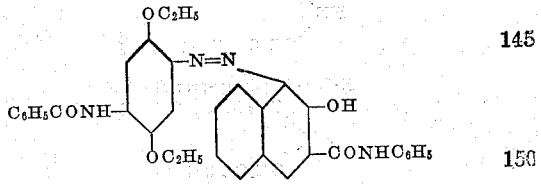

In the illustrative examples previously given representative compounds were selected from those arylamines and secondary aliphatic amines which fall within the scope of the present invention. However, it is to be understood that numerous other compounds may be used, with comparable results, without departing from the scope of the present invention. For example, among the many arylamines which may be used with satisfactory results mention may be made of the following:

Ortho-chloro-aniline
Meta-chloro-aniline
Meta-amino-benzotrifluoride
4-nitro-2-amino-toluene
4-chloro-2-amino-toluene
3-nitro-4-amino-toluene
5-nitro-2-amino-anisole
3-nitro-4-amino-anisole
4-amino-6-benzoylamino-1:3-xylene
4'-ethoxy-4-amino-diphenylamine
Dianisidine
4,4'-diamino-diphenyl-ether
4-benzoylamino-2,5-dimethoxy-aniline
Alpha-amino-anthraquinone
3-amino-carbazole
Para-methyl-ortho-nitro-benzene-azo-cresidine
4,4'-diamino-diphenylamine In addition to the arylamines specifically referred to heretofore, other arylamines possessing the same or different aromatic nuclei may be used. In general, any of the arylamines and their derivatives, free from carboxylic and sulfonic acid groups, may be used; although somewhat more favorable results are usually obtained by selecting those amines specifically referred to herein. As a class, the amines of the benzene and naphthalene series which may be further substituted with alkyl, alkoxy, nitro, halogen, trifluoromethyl and acylamino groups, appear to give the optimum results. However, this invention is not intended to be limited thereto, since amines of the diphenyl, diphenyl-ether, azo-benzene, diphenylamine, anthraquinone and carbazole series, whether unsubstituted or substituted with the aforementioned or related groups, also give good results.

The arylamines are diazotized and coupled with secondary aliphatic or hydroaromatic amines containing at least one hydroxyl group and in addition at least one carboxylic acid and/or sulfonic acid group. A wide variety of secondary amines may therefore be used in producing the diazoimino compounds. A few of the compounds which fall within this category and have been used with surprisingly good results are the following:

β-γ dihydroxy-propyl-taurine
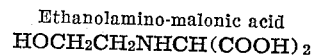

β-β'-dihydroxy-dipropylamine-γ-γ'-disulfonic acid
HN(CH₂CHOHCH₂SO₃H)₂

1-xylamino-butane-4-sulfonic acid
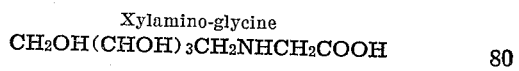

N-(β-γ-dihydroxy-propyl)-glycine
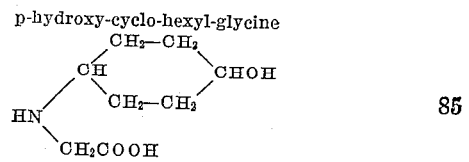

Ethanolamino-malonic acid
HOCH₂CH₂NHCH(COOH)₂

Xylamino-glycine
CH₂OH(CHOH)₃CH₂NHCH₂COOH p-hydroxy-cyclo-hexyl-glycine
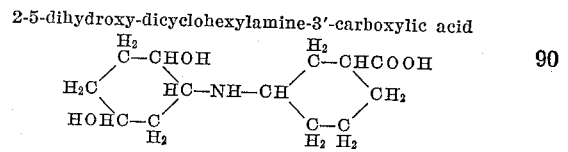

2-5-dihydroxy-dicyclohexylamine-3'-carboxylic acid
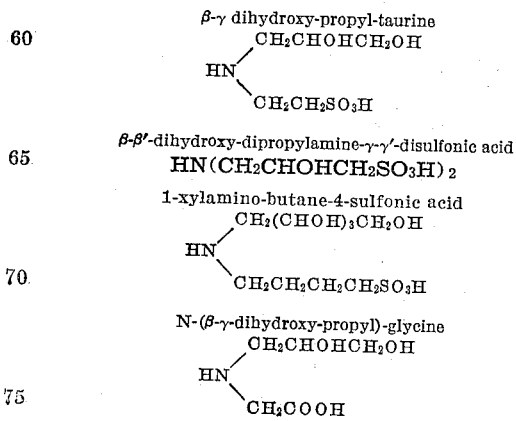

It is, of course, understood that while the illustrative compounds previously given contain in addition to the hydroxyl group or groups either one or more carboxylic acid groups or one or more sulfonic acid groups, that the instant invention comprises those aliphatic and hydroaromatic secondary amino compounds which contain in addition to the hydroxyl group or groups one or more carboxylic acid groups in addition to one or more sulfonic acid groups.

The procedure whereby the new diazoimino compounds are formed is subject to considerable variation and modification, in accordance with the amine diazotized and the secondary amine with which the diazo salt is reacted. These modifications are well known to one skilled in the art and need not be discussed in the present application. Likewise, the isolation of the products may be effected by various methods. For example, they may be separated from solution by "salting" methods; in other instances, because of their great solubility, they may be obtained by evaporation to dryness, preferably under reduced pressure. As is well known, their purification may be accomplished by crystallization from water or some other solvent, or by extraction with a solvent, such as ethyl alcohol.

The diazoimino compounds described are particularly adapted for use in one-bath dyeing processes, a few illustrations of the same having been included in the examples. After impregnating the fabrics with mixtures of these new diazoimino compounds and coupling components, the colors may be developed by:

(1) Steaming in the presence of a volatile acid (acetic and/or formic acid)

(2) Treatment with a hot dilute solution of acids, preferably the organic acid or acids used in (1)

(3) Treatment in boiling saline solutions containing small quantities of acids for development.

These new products are especially valuable in the development of ice colors on fabrics, particularly cotton or regenerated cellulose. On the whole, they give surprisingly good results, probably due to their excellent solubility, good penetration of the fiber, and ease of reversion to the diazo salt followed by coupling on the fiber to form the insoluble ice color. Dry mixtures of these diazoimino compounds with the ice color coupling components are very stable and may be stored for long periods of time without decomposition or interaction.

As many apparently widely different embodiments of this invention may be made without departing from the spirit and scope thereof, it is to

We claim:

1. A process for making water-soluble diazoimino compounds suitable for use in the production of ice colors which comprises reacting a diazotized aromatic amine with a secondary amine having the following general formula:

in which $R_1$ and $R_2$ represent aliphatic or hydroaromatic residues, and wherein this secondary amine contains at least one hydroxyl group and at least one member selected from the group consisting of carboxylic and sulfonic acid radicals.

2. A process for making water-soluble diazoimino compounds suitable for use in the production of ice colors which comprises reacting a diazotized aromatic amine with a secondary amine having the following general formula:

in which $R_1$ represents an aliphatic or hydroaromatic residue, $R_2$ represents a hydroaromatic residue, and wherein this secondary amine contains at least one hydroxyl group and at least one member selected from the group consisting of carboxylic and sulfonic acid radicals.

3. A process for making water-soluble diazoimino compounds suitable for use in the production of ice colors which comprises reacting a diazotized aromatic amine with a secondary amine having the following general formula:

in which $R_1$ and $R_2$ represent aliphatic or hydroaromatic residues and wherein this secondary amine contains at least four hydroxyl groups and at least one member selected from the group consisting of carboxylic and sulfonic acid radicals.

4. A process for making water-soluble diazoimino compounds suitable for use in the production of ice colors which comprises reacting a diazotized aromatic amine selected from the group consisting of amino derivatives of benzene, naphthalene, diphenyl, diphenyl-ether, azobenzene, diphenylamine, anthraquinone, and carbazole, with a secondary amine having the following general formula:

in which $R_1$ and $R_2$ represent aliphatic or hydroaromatic residues, and wherein this secondary amine contains at least one hydroxyl group and at least one member selected from the group consisting of carboxylic and sulfonic acid radicals.

5. The process of claim 4 wherein the diazo component has substituted thereon members selected from the group consisting of alkyl, alkoxy, nitro, halogen, trifluoromethyl and acylamino radicals.

6. A process for making water-soluble diazoimino compounds suitable for use in the production of ice colors which comprises reacting a diazotized amine of the benzene or naphthalene series, which may have substituted thereon members selected from the group consisting of alkyl, alkoxy, nitro, halogen, trifluoromethyl and acylamino; with a secondary amine having the following general formula:

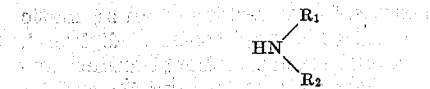

in which $R_1$ and $R_2$ represent aliphatic residues, and wherein this secondary amine contains at least one hydroxyl group and at least one member selected from the group consisting of carboxylic and sulfonic acid radicals.

7. A process for making water-soluble diazoimino compounds suitable for use in the production of ice colors which comprises reacting a diazotized amine of the benzene series, which may have substituted thereon members selected from the group consisting of alkyl, alkoxy, nitro, halogen, trifluoromethyl, and acylamino; with a secondary amine having the following general formula:

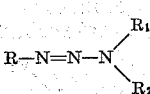

in which $R_1$ and $R_2$ represent aliphatic residues, and wherein this secondary amine contains at least one hydroxyl group and in addition one carboxylic or sulfonic acid group.

8. The process of claim 7 wherein $R_1$ and $R_2$ together contain at least four hydroxyl groups.

9. A water-soluble diazoimino compound suitable for use in the production of ice colors having the following general formula:

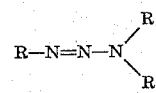

in which R represents the residue of an aromatic amine, and $R_1$ and $R_2$ represent aliphatic or hydroaromatic residues at least one of which contains at least one hydroxyl group and at least one of which contains at least one carboxyl and/or sulfonic acid group.

10. A water-soluble diazoimino compound suitable for use in the production of ice colors having the following general formula:

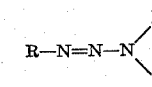

in which R represents the residue of an aromatic amine, $R_1$ represents an aliphatic or hydroaromatic residue, $R_2$ represents a hydroaromatic residue, and wherein at least one of the components $R_1$ and $R_2$ contains at least one hydroxyl group and at least one of which contains at least one carboxyl and/or sulfonic acid group.

11. A water-soluble diazoimino compound suitable for use in the production of ice colors having the following general formula:

R—N=N—N⟨$R_1$/$R_2$ in which R represents the residue of an aromatic amine, and $R_1$ and $R_2$ represent aliphatic or hydroaromatic residues which together contain at least four hydroxyl groups.

12. A water-soluble diazoimino compound suitable for use in the production of ice colors having the following general formula:

in which R represents the residue of an aromatic amine of the benzene, naphthalene, diphenyl, diphenyl-ether, azobenzene, diphenyl-amine, anthraquinone, or carbazole series, and $R_1$ and $R_2$ represent aliphatic or hydroaromatic residues at least one of which contains at least one hydroxyl group and at least one of which contains at least one carboxyl and/or sulphonic acid group.

13. The compound defined in claim 9 wherein the component represented by R has substituted thereon members selected from the group consisting of alkyl, alkoxy, nitro, halogen, trifluoromethyl and acylamino radicals.

14. A water-soluble diazoimino compound suitable for use in the production of ice colors having the following general formula:

in which R represents the residue of an aromatic amine of the benzene or naphthalene series, which may have substituted thereon members selected from the group consisting of alkyl, alkoxy, nitro, halogen, trifluoromethyl and acylamino; and $R_1$ and $R_2$ represent aliphatic residues at least one of which contains at least one hydroxyl group and at least one of which contains at least one carboxyl and/or sulfonic acid group.

15. A water-soluble diazoimino compound suitable for use in the production of ice colors having the following general formula:

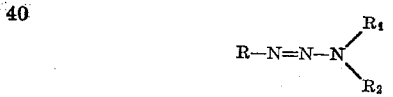

in which R represents the residue of an aromatic amine of the benzene series, which may have substituted thereon members selected from the group consisting of alkyl, alkoxy, nitro, halogen, trifluoromethyl and acylamino; and $R_1$ and $R_2$ represent aliphatic residues at least one of which contains at least one hydroxyl group and one of which contains a carboxyl or sulfonic acid group.

16. A water-soluble diazoimino compound suitable for use in the production of ice colors having the following general formula:

in which R represents the residue of an aromatic amine of the benzene series, which may have substituted thereon members selected from the group consisting of alkyl, alkoxy, nitro, halogen, trifluoromethyl and acylamino; and $R_1$ and $R_2$ represent aliphatic residues which together contain at least four hydroxyl groups and in addition at least one carboxylic or sulfonic acid group.

17. The process for making water-soluble diazoimino compounds suitable for use in the production of ice colors which comprises reacting a diazotized aromatic amine with a secondary amine having the following general formula:

in which $R_1$ and $R_2$ represent aliphatic radicals, $R_1$ containing a hydroxyl group and $R_2$ containing a sulfo group.

18. A water-soluble diazoimino compound suitable for use in the production of ice colors having the following general formula:

in which R represents the aryl radical of a diazotized aromatic amine, and $R_1$ and $R_2$ represent aliphatic radicals, $R_1$ containing a hydroxyl group and $R_2$ containing a sulfo group.

FLETCHER BEACH HOLMES.
MILES AUGUSTINUS DAHLEN.